United States Patent [19]

Kimura et al.

[11] Patent Number: 4,713,496
[45] Date of Patent: Dec. 15, 1987

[54] COORDINATE INPUT DEVICE

[75] Inventors: Kiyoshi Kimura; Osamu Hara, both of Miyagi, Japan

[73] Assignee: Alps Electric Co., Ltd., Japan

[21] Appl. No.: 869,401

[22] Filed: Jun. 2, 1986

[30] Foreign Application Priority Data

May 31, 1985 [JP] Japan ................................ 60-117761

[51] Int. Cl.[4] .............................................. G08C 21/00
[52] U.S. Cl. ...................................................... 178/18
[58] Field of Search .............................. 178/18, 19, 20

[56] References Cited

U.S. PATENT DOCUMENTS 4,213,005  7/1980  Cameron ................................ 178/18

Primary Examiner—Stafford D. Schreyer
Attorney, Agent, or Firm—Guy W. Shoup

[57] ABSTRACT

A coordinate input device is disclosed according to the invention, there is provided a plurality of conductors embedded in parallel on an input plane, scanning signals are supplied sequentially in such a manner of applying concurrently signals of the same phase to at least two of the conductors, then with special attention to the scanning position discriminated where the polarity of a scanning signal detected with a coordinate indicator is discriminated to have inverted, the levels of the signals before and after the inversion of their polarity are detected so as to determine where the coordinate indicator is positioned between the conductors.

3 Claims, 7 Drawing Figures

INPUT COORDINATE VALUES $(X_1, Y_1)$

COORDINATE INPUT DEVICE

BACKGROUND OF THE INVENTION

1. Field of the Invention

This invention relates to a coordinate input device having the construction permitting to read a position indicated on an input plane.

2. Description of the Prior Art

There is a known coordinate input device for reading at a high precision a position indicated on a plane, as exemplified in Japanese Patent Publication No. 13074/1984. In the device, scanning signals, such as rectangular pulses, are sequentially applied to a plurality of scanning lines embedded in parallel on a tablet, induction signals conveyed by the so-called rectangular pulse scanning signals on a scanning line are detected by a coordinate indicator brought into approach, which has a excitation winding for establishing alternating magnetic field on the scanning lines. Then a rectangular pulse scanning signal involved in maximum induction signal value is searched, thus the scanning line transmitting this scanning signal being correspondent to the nearest scanning line of the coordinate indicator, and used to determine the coordinate value of it. Subsequently, the distance from the nearest scanning line to the coordinate indicator, that is, a coordinate value between scanning lines is determined from the maximum value of detected induction signal and the intensity of an arbitrary induction signal adjacent to the induction signal of the maximum value. The sum of the coordinate value of the nearest scanning line and the distance to the coordinate indicator determined as described above is computed to determine the input coordinate value of the coordinate indicator.

There however is the problem encountered in the prior art that the difference between the maximum value of a detected induction signal and the value of an arbitrary induction signal adjacent to it can be used to determine the distance from the nearest scanning line to the coordinate indicator, with a not always sufficient precision to directly compute the difference because there is a non-linear relationship between the difference and the distance. Hence the computation of the coordinate value between the scanning lines must be made on the basis of the value of the above-mentioned difference read from a ROM (Short for read only memory) on which it is stored in the form of an address signal as it were, which consequently needs previous storage of a suitable table on the ROM. Another problem involved in the prior art is that the so-called normalization by division must be made in order to avoid the influence of the variable thickness of a read media, such as paper, interposed between a tablet and an alternating magnetic field generator provided at the fore end, and variation in impedance of a scanning line and in the alternating magnetic field. Besides these conjointly brings a disadvantage of high cost.

SUMMARY OF THE INVENTION

The feature of the present invention resides in brief in that for the purpose of solving the above-mentioned problems, scanning signals are transmitted sequentially in such a way of concurrently applying signals of the same phase to at least two conductors, and the transmitted signals are detected with a coordinate indicator.

In a coordinate input device according to the invention, there is provided a plurality of conductors embedded in parallel on an input plane, scanning signals are supplied sequentially in such a manner of applying concurrently signals of the same phase to at least two of the conductors, then with special attention to the scanning position discriminated where the polarity of a scanning signal detected with a coordinate indicator is discriminated to have inverted, the levels of the signals before and after the inversion of their polarity are detected so as to determine where the coordinate indicator is positioned between the conductors.

DESCRIPTION OF THE PREFERRED EMBODIMENT OF THE INVENTION

Figure 1:
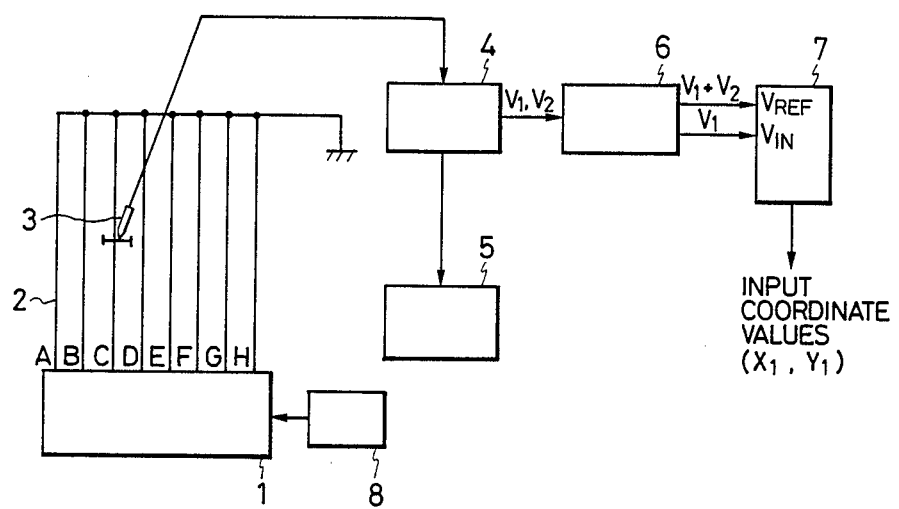
FIG. 1 is a block diagram illustrating the principal configuration of the present invention.

FIG. 1 gives a block diagram illustrating the principal configuration of the present invention. In FIG. 1, reference numerals designate 1, a switching circuit; 2, conductors embedded in parallel in an input plane; 3, a pick up for detecting in the form of electric signal the magnetic field produced by flows of high frequency current on conductors; 4, an amplifier; 5, a polarity discrimnation circuit; 6, a memory circuit; 7, an A/D converter; and 8, an oscillator for applying a high frequency current to the conductors 2.

In FIG. 1, the switching circuit 1 operates to control the supply of high frequency current produced by the oscillator 8 to permit sequential scanning, for example, every at least two conductors 2 adjacent to each other as a unit.

The pick up 3 functions to detect high frequency magnetic field scanning by the high frequency current supplied to conductors 2. The detected signal is amplified by the amplifier 4, and the amplified signal is applied to the polarity discrimination circuit 5 and the memory circuit 6. The A/D converter 7 outputs an input coordinate values $(X_i, Y_i)$ on the basis of signals read from the memory circuit 6. In addition to conductors 2 disposed only in the X direction as shown, conductors likewise in Y direction permitting determination of values of input coordinate $Y_i$ are provided.

High frequency current produced by the oscillator 8 is supplied in the manner of scanning sequentially every at least two conductors as a unit according to the function of the switching circuit 1. Concretely speaking, the same phase high frequency current is applied to any combination of two conductors, for example, A and B, B and C, C and D, and D and E. The pick up 3 has a function of detecting in a form of electric signal a scanning magnetic field established by the supply of a high frequency current, and outputs to an amplifier 4. The amplified signal from the amplifier 4 is detected by the polarity discriminating circuit 5 where, in respect to the scanning position, the polarity of the above-mentioned signal is inverted. Upon detecting the inversion of the polarity, the signal $V_2$ applied from the amplifier 4 to the memory circuit 6 is stored. Then a command is generated to the switching circuit 1 so that a high frequency current is supplied on the conductors 2 to the scanning position directly before inversion of the polarity of the above-mentioned signal, and then signal $V_1$ supplied from the amplifier 4 to the memory circuit 6 is stored thereon. Further the summed signal of signals $V_1$ and $V_2$ stored on the memory circuit 6 is applied to the reference voltage input terminal $V_{ref}$ and either $V_1$ or $V_2$ is applied to the input terminal $V_{in}$ of the A/D converter 7. The A/D converter 7 outputs input coordinate value $X_i$ at the position designated by the pick up 3. The input coordinate value $Y_i$ is obtained similarly.

Figure 2:
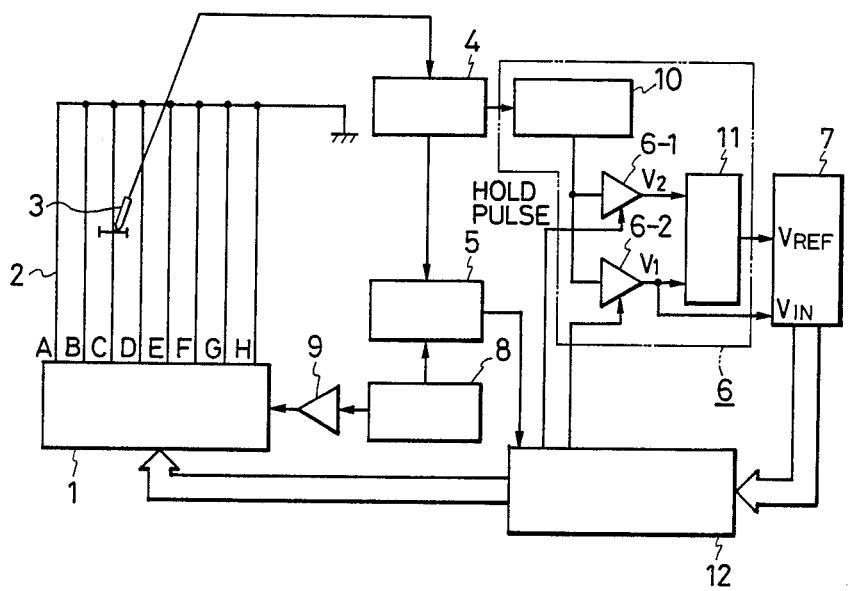
FIG. 2 is a block diagram illustrating the configuration of an embodiment according to the invention.

FIG. 2 gives a block diagram illustrating an embodiment of the invention, in which reference characters designate $6_1$ and $6_2$, sampling/holding circuits, 9, a driver; 10, a detector; 11, adder; and 12, a controller. The other reference numerals 1 through 8 are correspondent to those in FIG. 1.

Figure 3:
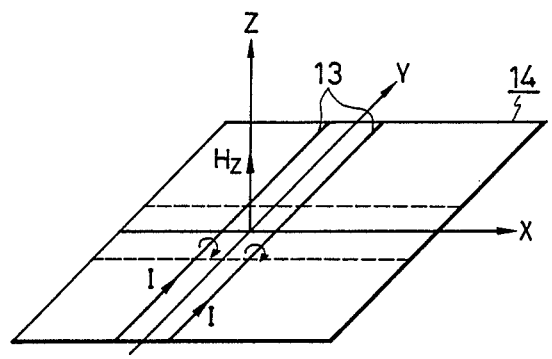
FIG. 3 is a view illustrating the parallel arrangement of conductors embedded in the input plane.

In FIG. 2, the coordinate input device according to the invention performs firstly a rough detection what conductor 2 the pick up 3 is positioned near to, and secondly highly precise detection accurately where it is positioned between the above-mentioned conductor and, for example, an adjacent conductor. The description of this will be given below:

The first rough detection is performed as follows: a desired data is applied to the switching circuit 1 from the controller 12, and so the switching circuit 1 is caused to operate to make sequential switching permitting scanning with high frequency current generated by the cooperation of the oscillator 8 and the driver 9 in such a way that the same strength current scans two conductors 2 adjacent to each other, such as A and B, B and C, C and D, D and E, . . . . A detected signal based upon the concurrently applied scanning signals to the adjacent conductors 2, referred to as $H_z$ represented in FIG. 3, is detected in the form of electric signal by the pick up 3, and amplified by the amplifier 4. The amplified signal is supplied to the polarity discriminator 5 and there whether or not the inversion of the polarity is induced in correspondence to what scanning point is discriminated. The result of discrimination that the polarity has inverted, if obtained, is informed to the controller 12. Thus determination of the approximate position of the pick up 3 has been accomplished.

The description of the highly precise determination will be given in the following:

Upon receiving the information of the inverted polarity, the controller 12 outputs a hold pulse to the sampling/holding circuit $6_1$ and causes it to hold a signal $V_2$, which denotes a signal input to it through amplification by the amplifier 4 and detection by the detector 10. The controller 12 also gives a control signal to the switching circuit 1 to cause it to return to the one-step preceding state in which high frequency current is supplied to the conductors 2. In addition, a hold pulse is supplied to the sampling/holding circuit $6_2$, and thus a signal $V_1$ input through amplification by the amplifier 4 and detection by the detector 10 is held on the sampling/holding circuit $6_2$. These held signals $V_1$ and $V_2$ are supplied to the adder 11 and the summed signal, $(V_1+V_2)$, is computed. The summed signal is supplied to the reference voltage input terminal $V_{ref}$ of the A/D converter 7 and either $V_1$ or $V_2$, such as $V_1$, is supplied to the input terminal $V_{in}$. Then the input abscissor, denoted by $X_i$, can be expressed as $$X_i = \frac{V_1}{V_1 + V_2} = \frac{V_1}{V_3}. \tag{1}$$

The input abscissor $X_i$ can be computed by supplying values of numerator and denominator of equation (1) to input terminals $V_{ref}$ and $V_{in}$, respectively, of the A/D converter 7 without needing any expensive division circuit. Since signal $V_1$ is normalized on the basis of the value of the summed signal $(V_1+V_2)$, the input abscissor value $X_i$ can be always stably computed independently of variation in the detected voltage, and is informed to the controller 12. Likewise, input ordinate value $Y_i$ is computed and informed to the controller 12. Coordinate values (X, Y) of the pick up in respect to the input plane are computed on the basis of these input abscissor and ordinate values, $X_i$ and $Y_i$, and the computation results are output.

The configuration of conductors 2 embedded in parallel in the input plane is illustrated in FIG. 3, in which reference numerals designate 13, conductors; and 14, an input plane. Coordinate axes X, Y and Z are set as shown in FIG. 3.

Figure 4A:
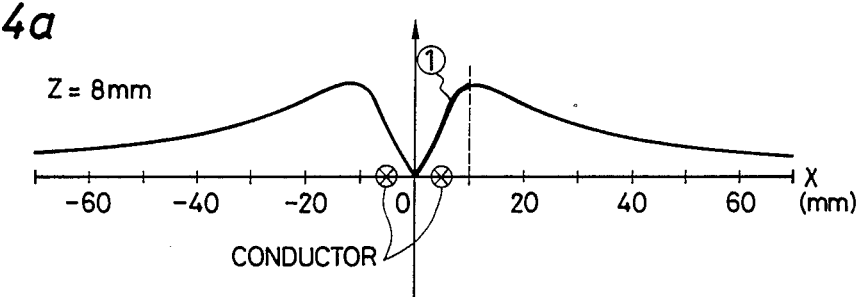
FIGS. 4a and 4b are graphs illustrating levels of detected signals.

In FIG. 3, current, denoted by "I", is caused to flow in similar direction as shown through each of two interadjacent conductors 13 embedded in the input plane 14 to establish a magnetic field, and the signal level detected varies with scanning position as shown in FIG. 4a. Strength of magnetic field at the middle point between the two conductors 13 is just zero as vector addition of magnetic fields established by the right and left conductors 13, thus the detected signal level being zero.

FIG. 4a gives the relationship between the signal level detected and the scanning position when current is flowed through a set of two conductors 13 in FIG. 3. In FIG. 4a, the height (Z) where the pick up 3 is positioned is set to 8 mm. The shown characteristic is of when the spacing between the two conductors 13 is taken 10 mm.

Figure 4B:
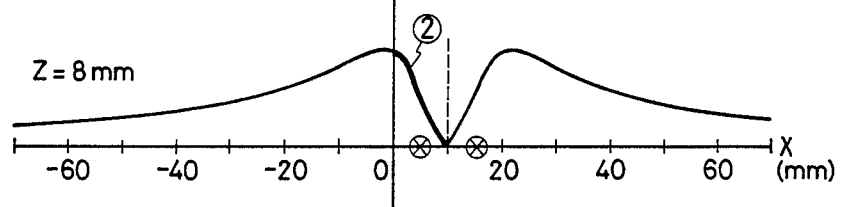

FIG. 4b gives the similar relation when the scanning position is one-step advanced state from that of FIG. 4a. The advanced state in which the same-direction current is flowed through two conductors disposed at +5 mm and +15 mm, respectively, in the X-direction as shown in FIG. 4b whereas the state shown FIG. 4a is of when flowed through two conductors disposed at −5 mm and 30 5 mm. The pick up 3 is positioned at a set height (Z) of 8 mm.

Figure 5:
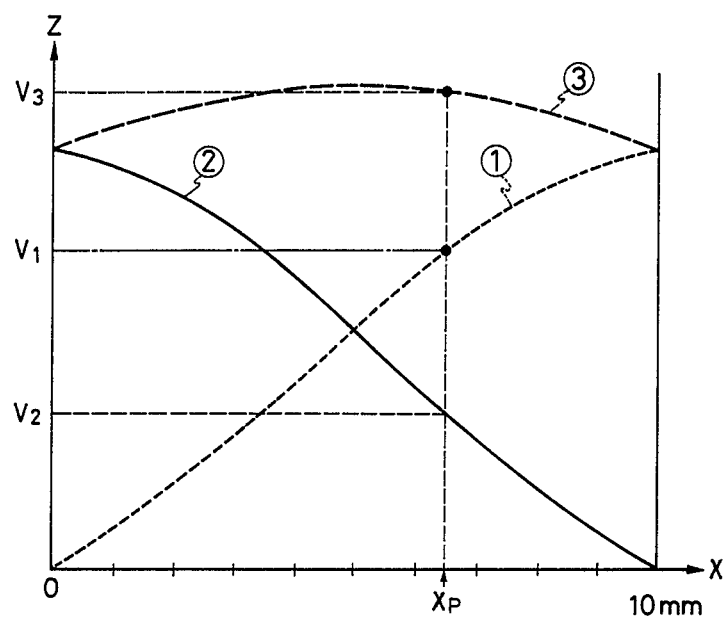
FIG. 5 shows in part the distribution of magnetic field of the concerned conductors.

FIG. 5 shows in an enlarged scale the bold portions, 1 and 2, of the lines in FIGS. 4a and 4b, which are correspondent to the range of X value between 0 and 10 mm.

Referring to FIG. 5, the procedure of dtermining abscissor where the pick up 3 is positioned on the input plane, such as $X_p$ will be described in detail:

Firstly signal $V_2$ correspondent to the strength of magnetic field at a position $X_p$, under the state of inverted polarity discriminated by the polarity discriminator 5 in FIG. 1 or FIG. 2, that is, the state of $V_2$ shown in FIG. 5 is held on the sampling/holding circuit $6_1$.

Secondly, signal $X_1$ correspondents to the strength of magnetic field at $X_p$ in the one-step preceding state to the first step, that is, the state of $V_1$ shown in FIG. 5, is held on the sampling/holding circuit $6_2$.

Thirdly, signal $V_2$ firstly-held and signal $V_1$ secondly-held are input to the adder 11, and the summed signal $(V_1+V_2)$ as shown in FIG. 5 is computed.

Fourthly, the summed signal $(V_1+V_2)$ computed in the preceding stage and either $V_1$ or $V_2$ are input to the reference voltage input terminal $V_{ref}$ and the input terminal $V_{in}$, respectively, of the A/D converter 7. Then the input abscissor X is computed in accordance with equation (1). Likewise the input ordinate Y can be computed.

Figure 6:
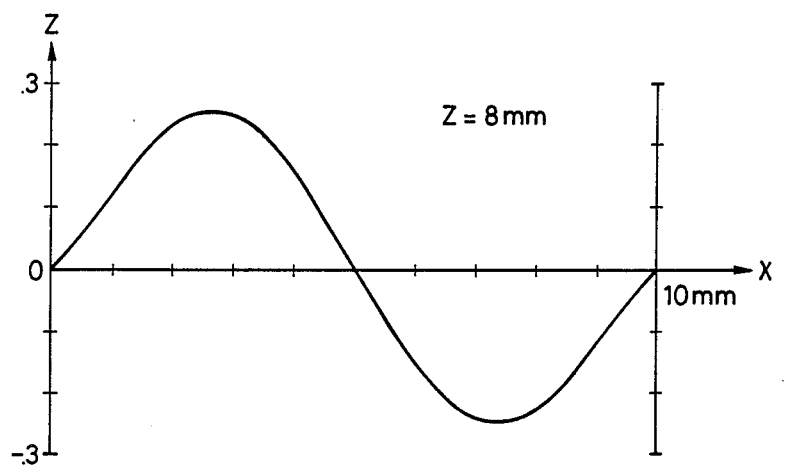
FIG. 6 shows an example of position determination error by the coordinate input device according to the invention.

The differences between the thus-computed input coordinate values (X, Y) and the coordinate values where the pick up 3 is actually positioned $(X_p, Y_p)$, for example, the error $(X-X_p)$ is computed and plotted, as represented in FIG. 6.

FIG. 6 shows an example of the error observed in determination of position by the coordinate input device according to the invention. In this example, the position of the pick up 3 can be determined at a high precision of below −0.3 mm.

The position of the pick up 3 can be determined also by sequential supply of current through three conductors 2 at similarly-high precision instead of that through two interadjacent conductors 2. The results shown in FIG. 6 is of when spacing between the two interadjacent conductors 2 is 10 mm, and the pick up 3 is positioned at a height of 8 mm. The experiments by the inventors have demonstrated that the error can be minimized by taking Z=0.93d to 0.97d, where d is a spacing between the conductors and Z is a height where the pick up 3 is positioned.

In the place of the above-described embodiment in which, to obtain $X_i$ expressed by equation (1), signal $(V_1+V_2)$ is supplied as reference input to the A/D converter 7, it may be used that signals $V_1$ and $V_2$ are applied in time-sharing way while the reference input is constantly held, and thus $X_i$ is obtained by arithmatic operation in the controller 12.

Further scanning by the switching circuit 1 may be performed in the combination of the n-th line such as conductor B shown in FIG. 2 and (n+2)-th line such as conductor D shown in FIG. 2.

As described above, the feature according to the invention resides in that sequential supply of scanning signal of the same phase is made conjunctly to at least two parallel conductors, the approximate position is determined on the basis of the inversion of the polarity of a detected signal, and in addition, where a coordinate indicator is positioned between the conductors is determined at a high precision on the basis of signals ($V_1$ and $V_2$) detected when respective signals before and after inversion of the polarity are applied to the conductors, and thus the invention provides the following advantages: firstly, it is no necessity to use a table and the likes stored on a ROM for computing where the coordinate indicator is positioned between the conductors; secondly, owing to the normalization using the sum of signals $V_1$ and $V_2$ detected before and after the inversion of polarity, a high precision determination of input coordinate values (X, Y) is possible substantially independently of the positional change of the coordinate indicator or pick up 3 in the Z direction, if the change is caused by variable thickness of a paper or the like inserted between the coordinate indicator and the input plane; thirdly, because of the employed procedure of making computation in accordance with equation (1) using the sum of detected signals $V_1$ and $V_2$ as the reference voltage and either $V_1$ or $V_2$ as an input voltage of the A/D converter 7, computation of coordinate values (X, Y) correspondent to equation (1) is possible in the form of the so-called conjunction with the conversion by the A/D converter 7 without needing any expensive division circuit; and fourthly determination of input coordinate at a high precision can be accomplished by suitably setting the position of the coordinate indicator.

What is claimed is:

1. A coordinate input device of the type in which scanning signals are supplied in sequence to conductors embedded in parallel in an input plane, and the coordinate values of a position is determined on the basis of detected signals by a coodinate indicator arbitrarily pointable on said input plane, comprising a switching circuit for supplying scanning signals sequentially to a plurality of conductors embedded in parallel in said input plane in such a way that scanning signals of the same phase are applied concurrently to at least two of said conductors, a coordinate indicator for detecting a signal derived from scanning signals transmitted on to said conductors in accordance with the operation of said switching circuit, and a polarity discriminator for dicriminating inversion of the polarity of the signal detected by said coordinate indicator, wherein, with special attention to the scanning position where inversion of the polarity has been discriminated by said polarity discriminator, the level of said signal is detected before and after the polarity of said signal detected by said coordinate indicator has been inverted, and a position is determined where said coordinate indicator is pointed on the basis of said position of polarity inversion discriminated and said signal level.

2. A coordinate input device defined in claim 1 wherein where said coordinate indicator is positioned between said conductors is determined on the basis of application, for one thing, of the sum of the levels of said signal detected by coordinate indicator, each level being that before and after the polarity of said signal has been inverted, respectively, as a reference voltage and, for another thing, of the level of either of said signals as an input signal of an A/D converter.

3. A coordinate indicator defined in claim 1 wherein where said coordinate indicator is positioned between said conductors is determined on the basis of the ratio of either to the sum of the signal levels obtained in time-sharing before and after the polarity of said signal detected by said coordinate indicator has inverted.

* * * * *